(12) United States Patent
Irisawa et al.

(10) Patent No.: US 7,608,833 B2
(45) Date of Patent: Oct. 27, 2009

(54) RADIATION IMAGE DETECTOR

(75) Inventors: Kaku Irisawa, Ashigarakami-gun (JP);
Fumito Nariyuki, Minamiashigara (JP);
Kenichi Hayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/240,299

(22) Filed: Sep. 29, 2008

(65) Prior Publication Data

US 2009/0084965 A1  Apr. 2, 2009

(30) Foreign Application Priority Data

Sep. 28, 2007 (JP) ............................. 2007-254604
Mar. 19, 2008 (JP) ............................. 2008-070925

(51) Int. Cl.
*H01L 27/146* (2006.01)

(52) U.S. Cl. ............................. 250/370.08; 250/370.09

(58) Field of Classification Search ............ 250/370.08, 250/370.09
See application file for complete search history.

(56) References Cited

U.S. PATENT DOCUMENTS

| 6,642,534 | B2 | 11/2003 | Shima et al. | |
| 2004/0094721 | A1* | 5/2004 | Tokuda et al. | 250/370.13 |
| 2006/0065880 | A1* | 3/2006 | Tanaka et al. | 252/500 |
| 2007/0125953 | A1* | 6/2007 | Miyake et al. | 250/370.01 |

FOREIGN PATENT DOCUMENTS

JP        2001-177140 A        6/2001

* cited by examiner

*Primary Examiner*—David P Porta
*Assistant Examiner*—Mindy Vu
(74) *Attorney, Agent, or Firm*—Sughrue Mion, PLLC

(57) ABSTRACT

A voltage applying electrode, to which a voltage is to be applied, a semiconductor layer, which is capable of generating electric charges when radiation is irradiated to the semiconductor layer, and an electrode for detecting an electric signal in accordance with a radiation dose are overlaid one upon another. A hole injection blocking layer is located between the voltage applying electrode and the semiconductor layer. The hole injection blocking layer contains an alloy of $Sb_xS_{100-x}$, where x represents a number satisfying the condition of $41 \leq x \leq 60$.

6 Claims, 7 Drawing Sheets

RADIATION IMAGE DETECTOR

BACKGROUND OF THE INVENTION

1. Field of the Invention

This invention relates to a radiation image detector, which is capable of generating electric charges when radiation carrying image information of an object is irradiated to the radiation image detector, and which is capable of recording a radiation image of the object through accumulation of the electric charges.

2. Description of the Related Art

Various radiation image detectors, which are capable of recording radiation images of objects when the radiation carrying image information of the objects is irradiated to the radiation image detectors, have heretofore been proposed and used in practice in medical fields, and the like.

Examples of the aforesaid radiation image detectors include the radiation image detectors utilizing amorphous selenium, which is capable of generating the electric charges when the radiation is irradiated to amorphous selenium. As the radiation image detectors utilizing amorphous selenium, there have been proposed the radiation image detectors employed for an optical read-out technique and the radiation image detectors employed for an electrical read-out technique.

FIG. 13 is an explanatory view showing positive hole injection in a conventional radiation image detector. As one of the radiation image detectors employed for the optical read-out technique, for example, as illustrated in FIG. 13, there has been proposed a radiation image detector comprising: (i) a first electrode layer 101, which has transmissivity to radiation carrying radiation image information, (ii) a recording photo-conductor layer 102, which generates electric charges when it is exposed to the radiation having passed through the first electrode layer 101, (iii) a charge transporting layer 103, which acts as an electrical insulator with respect to the electric charges having a certain polarity among the electric charges having been generated in the recording photo-conductor layer 102, and which acts as an electrical conductor with respect to the electric charges having an opposite polarity, (iv) a reading photo-conductor layer 104, which generates electric charges when it is exposed to reading light, and (v) a second electrode layer, which is constituted of transparent linear electrodes 106, 106, . . . having the transmissivity to the reading light and light blocking linear electrodes 107, 107, . . . for blocking the reading light, wherein the first electrode layer 101, the recording photo-conductor layer 102, the charge transporting layer 103, the reading photo-conductor layer 104, and the second electrode layer are overlaid in this order.

In cases where a radiation image is to be recorded on the radiation image detector employed for the optical read-out technique as described above, firstly, a negative voltage is applied from a high voltage electric power source to the first electrode layer 101 of the radiation image detector. Also, in this state, radiation carrying radiation image information of an object is irradiated from the side of the first electrode layer 101 of the radiation image detector.

The radiation, which has thus been irradiated to the radiation image detector, passes through the first electrode layer 101 and impinges upon the recording photo-conductor layer 102. As a result, pairs of positive and negative charges are generated in the recording photo-conductor layer 102 by the irradiation of the radiation. Of the pairs of positive and negative charges having been generated in the recording photo-conductor layer 102, the positive charges combine with the negative charges occurring in the first electrode layer 101 and become extinct. Of the pairs of positive and negative charges having been generated in the recording photo-conductor layer 102, the negative charges are accumulated as latent image charges at a charge accumulating section 105, which is formed at an interface between the recording photo-conductor layer 102 and the charge transporting layer 103. The radiation image is thus recorded as illustrated in FIG. 13.

In cases where the radiation image having thus been recorded is to be read out from the radiation image detector, the first electrode layer 101 is grounded. In this state, the reading light is irradiated from the side of the second electrode layer to the radiation image detector. The reading light, which has been irradiated from the side of the second electrode layer, passes through the transparent linear electrode 106 of the second electrode layer and impinges upon the reading photo-conductor layer 104. As a result, pairs of positive and negative charges are generated in the reading photo-conductor layer 104 by the irradiation of the reading light. Of the pairs of positive and negative charges having been generated in the reading photo-conductor layer 104, the positive charges combine with the latent image charges having been accumulated at the charge accumulating section 105. Also, of the pairs of positive and negative charges having been generated in the reading photo-conductor layer 104, the negative charges combine with the positive charges occurring in the transparent linear electrode 106 and the light blocking linear electrode 107. An electric current flowing at the time, at which the negative charges in the reading photo-conductor layer 104 and the positive charges of the transparent linear electrode 106 and the light blocking linear electrode 107 thus undergo the combination, is detected by a charge amplifier, which is connected to the light blocking linear electrode 107. In this manner, an image signal representing the radiation image having been recorded is read out from the radiation image detector.

However, as illustrated in FIG. 13, in cases where the first electrode layer 101 is grounded for the readout of the image signal after the radiation image has been recorded on the radiation image detector in the manner described above, positive holes are injected from the first electrode layer 101 into the recording photo-conductor layer 102 due to the effects of the electrons having been accumulated at the charge accumulating section 105. Due to the injection of the positive hole, noise is mixed in the image signal having been read out, and the image quality of the radiation image having been read out becomes bad.

Also, as one of the radiation image detectors employed for the electrical read-out technique, for example, there has been proposed a radiation image detector comprising: (i) a top electrode, to which a voltage is to be applied, (ii) a semiconductor layer, which is capable of generating electric charges when radiation is irradiated to the semiconductor layer, and (iii) an active matrix substrate, the top electrode, the semiconductor layer, and the active matrix substrate being overlaid one upon another, the active matrix substrate being constituted of a plurality of pixels arrayed in a two-dimensional pattern, each of the pixels being provided with (a) a collecting electrode for collecting electric charges having been generated in the semiconductor layer, (b) an accumulating capacitor for accumulating the electric charges having been collected by the collecting electrode, and (c) a TFT switch for reading out the electric charges having been accumulated by the accumulating capacitor.

In cases where a radiation image is to be recorded on the radiation image detector using the TFT as described above, firstly, a positive voltage is applied from a voltage source to the top electrode of the radiation image detector. Also, in this state, radiation carrying radiation image information of an object is irradiated from the side of the top electrode of the radiation image detector.

The radiation, which has thus been irradiated to the radiation image detector, passes through the top electrode and impinges upon the semiconductor layer. As a result, pairs of positive and negative charges are generated in the semiconductor layer by the irradiation of the radiation. Of the pairs of positive and negative charges having been generated in the semiconductor layer, the negative charges combine with the positive charges occurring in the top electrode and become extinct. Of the pairs of positive and negative charges having been generated in the semiconductor layer, the positive charges are collected as latent image charges by the collecting electrode of each of the pixels constituting the active matrix substrate. The positive charges having thus been collected are accumulated by the accumulating capacitor. The radiation image is recorded in this manner.

In cases where the radiation image having thus been recorded is to be read out from the radiation image detector, the TFT switch of the active matrix substrate is turned on by a control signal having been outputted from a gate driver, and the electric charges having been accumulated by the accumulating capacitor are read out. The electric charges having thus been read out are detected by a charge amplifier. In this manner, the image signal representing the radiation image is read out.

However, in the cases of the radiation image detector employed for the electrical read-out technique, at the time at which the positive voltage is applied to the top electrode in the manner described above, positive holes are injected from the top electrode into the semiconductor layer by the voltage application. As a result, as illustrated in FIG. 9, after the irradiation of the radiation has been ceased, the positive holes are injected from the top electrode. The thus injected positive holes are detected as a residual image current (as indicated by the hatching in FIG. 9). Therefore, noise is mixed in the image signal having been read out, and the image quality of the radiation image having been read out becomes bad.

Radiation image detectors utilizing amorphous selenium have also been proposed in, for example, the literatures of U.S. Pat. No. 6,642,534 and Japanese Unexamined Patent Publication No. 2001-177140. In the cases of the radiation image detectors described in these literatures, such that electric charges may be prevented from being injected from an electrode, to which a voltage is to be applied, into an amorphous selenium layer, it is proposed to locate a layer that is formed from $Sb_2S_3$ between the electrode and the amorphous selenium layer.

However, it has been found that, with the layer that is formed from $Sb_2S_3$, though the effects of blocking the injection of the electric charges are capable of being obtained, depending upon the layer thickness, the obtained effects are not always be sufficient, and the image quality of the radiation image having been read out is not always be capable of being kept good.

SUMMARY OF THE INVENTION

The primary object of the present invention is to provide a radiation image detector, wherein injection of electric charges from an electrode into a semiconductor layer is capable of being suppressed sufficiently, and wherein image quality of a radiation image having been read out is capable of being kept good.

The present invention provides a radiation image detector, comprising:

i) a voltage applying electrode, to which a voltage is to be applied, ii) a semiconductor layer, which is capable of generating electric charges when radiation is irradiated to the semiconductor layer, and iii) an electrode for detecting an electric signal in accordance with a radiation dose, the voltage applying electrode, the semiconductor layer, and the electrode for detecting the electric signal being overlaid one upon another, an image signal in accordance with the electric charges, which have been generated in the semiconductor layer, being read out from the radiation image detector, wherein a hole injection blocking layer is located between the voltage applying electrode and the semiconductor layer, and the hole injection blocking layer contains an alloy of $Sb_xS_{100-x}$, where x represents a number satisfying the condition of $41 \leq x \leq 60$.

The radiation image detector in accordance with the present invention may be modified such that a thickness of the hole injection blocking layer falls within the range of 0.25 μm to 3 μm.

Also, the radiation image detector in accordance with the present invention may be modified such that a crystallization preventing layer that contains Se and As as principal constituents is located between the hole injection blocking layer and the semiconductor layer.

Further, the radiation image detector in accordance with the present invention may be modified such that a concentration of the As constituent in the crystallization preventing layer falls within the range of 2% to 15%.

Furthermore, the radiation image detector in accordance with the present invention may be modified such that a negative voltage is applied to the voltage applying electrode at the time of the irradiation of the radiation, and the voltage applying electrode is grounded at the time of the readout of the image signal from the radiation image detector.

Also, the radiation image detector in accordance with the present invention may be modified such that a positive voltage is applied to the voltage applying electrode at the time of the irradiation of the radiation.

With the radiation image detector in accordance with the present invention, the hole injection blocking layer is located between the voltage applying electrode and the semiconductor layer, and the hole injection blocking layer contains the alloy of $Sb_xS_{100-x}$, where x represents a number satisfying the condition of $41 \leq x \leq 60$. Therefore, the injection of the positive holes from the voltage applying electrode into the semiconductor layer is capable of being suppressed sufficiently, and the image quality of the radiation image having been read out is capable of being kept good.

Also, with the radiation image detector in accordance with the present invention, wherein the crystallization preventing layer that contains Se and As as the principal constituents is located between the hole injection blocking layer and the semiconductor layer, it is possible to suppress the formation of crystal nucleuses in the semiconductor layer at the time of the formation of the hole injection blocking layer.

Further, with the radiation image detector in accordance with the present invention, wherein the concentration of As in the crystallization preventing layer falls within the range of 2% to 15%, the hole injection blocking effects of the hole injection blocking layer are capable of being kept, and the formation of crystal nucleuses in the semiconductor layer is capable of being suppressed.

DESCRIPTION OF THE PREFERRED EMBODIMENTS

The present invention will hereinbelow be described in further detail with reference to the accompanying drawings.

Figure 1:
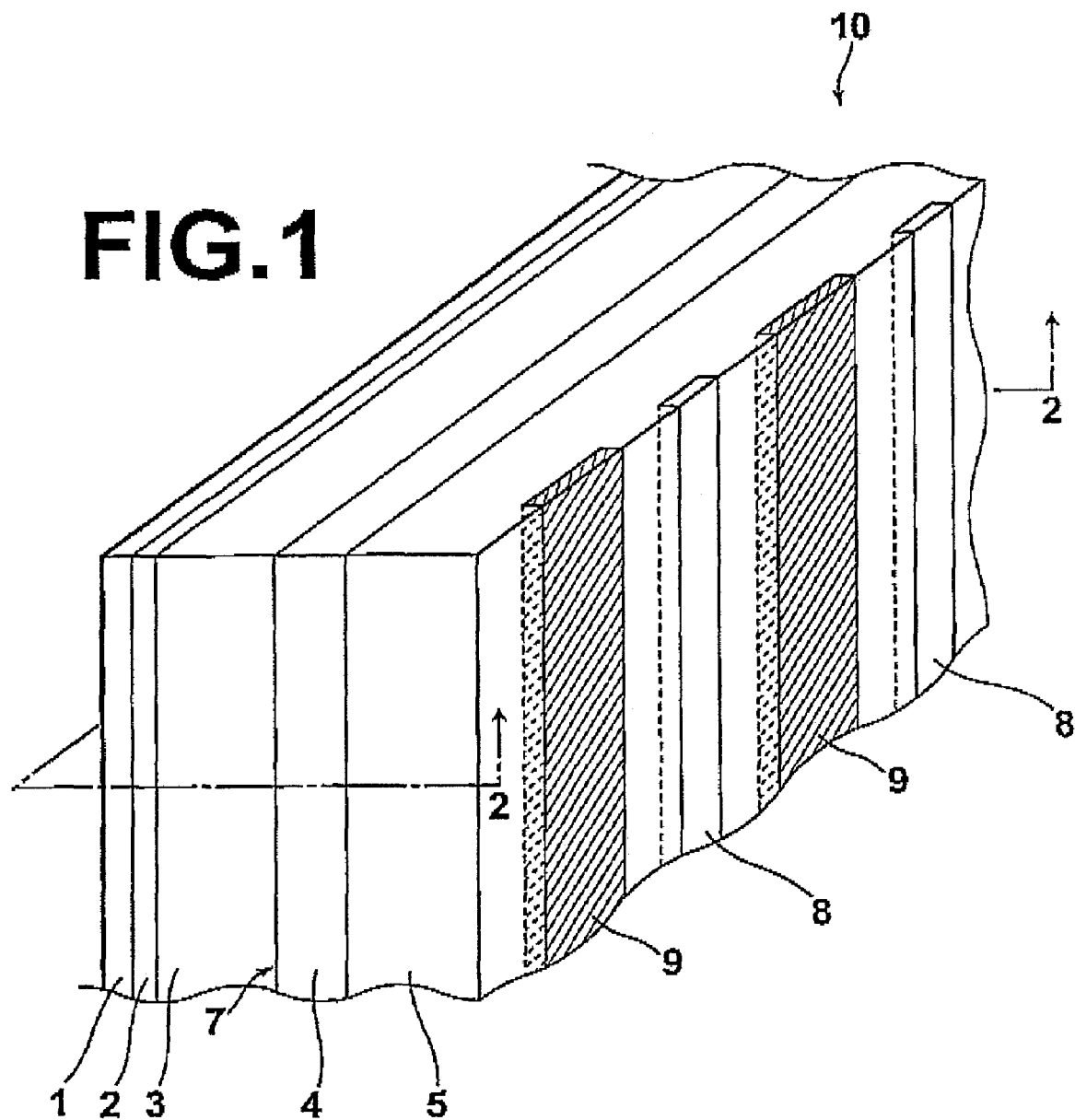
FIG. 1 is a perspective view showing a first embodiment of the radiation image detector in accordance with the present invention.
Figure 2:
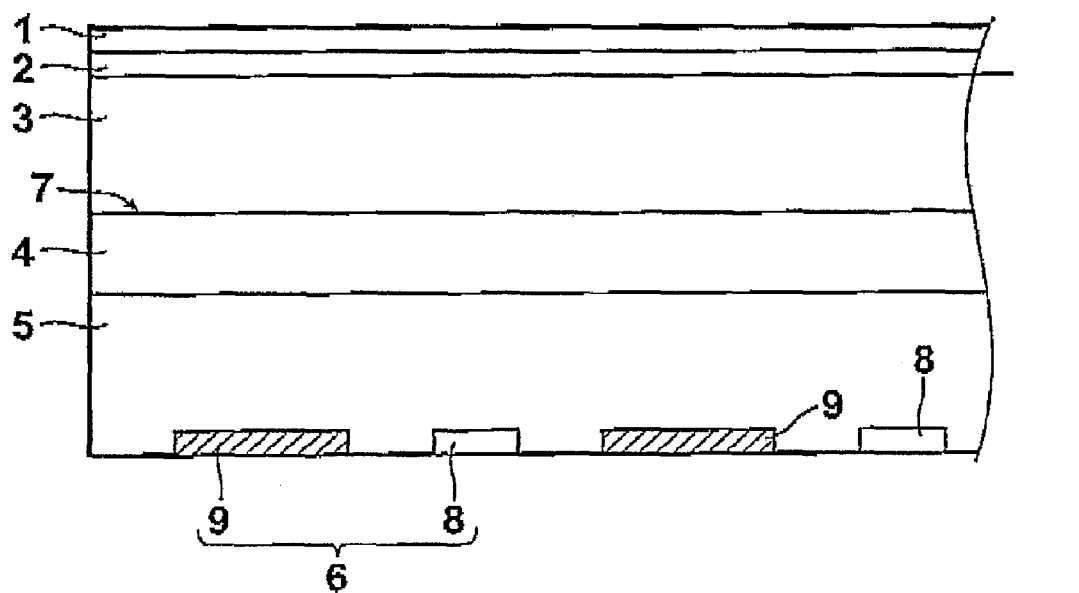
FIG. 2 is a sectional view taken on line 2-2 of FIG. 1.

A first embodiment of the radiation image detector in accordance with the present invention will be described hereinbelow. The first embodiment of the radiation image detector in accordance with the present invention is the radiation image detector employed for the optical read-out technique. FIG. 1 is a perspective view showing a first embodiment of the radiation image detector in accordance with the present invention. FIG. 2 is a sectional view taken on line 2-2 of FIG. 1.

As illustrated in FIG. 1 and FIG. 2, a radiation image detector 10, which is the first embodiment of the radiation image detector in accordance with the present invention, comprises a first electrode layer 1, which has the transmissivity to the radiation carrying radiation image information. The radiation image detector 10 also comprises a hole injection blocking layer 2. The radiation image detector 10 further comprises a recording photo-conductor layer 3, which generates the electric charges when the radiation having passed through the first electrode layer 1 is irradiated to the recording photo-conductor layer 3. The radiation image detector 10 still further comprises a charge transporting layer 4. The charge transporting layer 4 acts as an electrical insulator with respect to the electric charges having a certain polarity, which electric charges have been generated in the recording photo-conductor layer 3. Also, the charge transporting layer 4 acts as an electrical conductor with respect to the electric charges having the opposite polarity, which electric charges have been generated in the recording photo-conductor layer 3. The radiation image detector 10 also comprises a reading photo-conductor layer 5, which generates the electric charges when the reading light is irradiated to the reading photo-conductor layer 5. The radiation image detector 10 further comprises a second electrode layer 6. The first electrode layer 1, the hole injection blocking layer 2, the recording photo-conductor layer 3, the charge transporting layer 4, the reading photo-conductor layer 5, and the second electrode layer 6 are overlaid in this order. A charge accumulating section 7, which accumulates the electric charges having been generated in the recording photo-conductor layer 3, is formed at a position in the vicinity of the interface between the recording photo-conductor layer 3 and the charge transporting layer 4. The layers described above are formed successively, beginning with the second electrode layer 6, on a glass substrate. In FIG. 1 and FIG. 2, for clearness, the glass substrate is not shown.

The first electrode layer 1 may be constituted of a material capable of transmitting the radiation. For example, the first electrode layer 1 may be constituted of a tin dioxide film ($SnO_2$), an indium tin oxide (ITO) film, an indium zinc oxide (IZO) film, an Idemitsu Indium X-metal Oxide (IDIXO) film (an amorphous light-transmissive oxide film, supplied by Idemitsu Kosan K.K.), which has a thickness falling within the range of 50 nm to 200 nm. As the first electrode layer 1, an Al film or an Au film having a thickness of 100 nm may also be utilized.

The second electrode layer 6 is constituted of a plurality of transparent linear electrodes 8, 8, . . . , which have the transmissivity to the reading light, and a plurality of light blocking linear electrodes 9, 9, . . . , which block the reading light. As illustrated in FIG. 1, the transparent linear electrodes 8, 8, . . . and the light blocking linear electrodes 9, 9, . . . are arrayed alternately and in parallel at a predetermined spacing from one another.

The transparent linear electrodes 8, 8, . . . are constituted of a material, which is capable of transmitting the reading light and has the electrical conductivity. The transparent linear electrodes 8, 8, . . . may be constituted of one of various materials as described above. For example, as in the cases of the first electrode layer 1, the transparent linear electrodes 8, 8, . . . may be constituted of ITO, IZO, IDIXO, or the like. Alternatively, the transparent linear electrodes 8, 8, . . . may be constituted of a metal material, such as Al or Cr, which has a thickness (e.g., approximately 10 nm) such that the metal material is capable of transmitting the reading light.

The light blocking linear electrodes 9, 9, . . . are constituted of a material, which is capable of blocking the reading light and has the electrical conductivity. The light blocking linear electrodes 9, 9, . . . may be constituted of one of various materials as described above. For example, the light blocking linear electrodes 9, 9, . . . may be constituted of a material, such as Cr, Mo, or W, which has a thickness falling within the range of 100 nm to 300 nm. Alternatively, a light blocking layer constituted of a resist material may be previously formed in a stripe-like pattern, the same material as that for the transparent linear electrodes 8, 8, . . . may then be formed in a stripe-like pattern, and the functions for the light-blocked electrode may thus be obtained.

The recording photo-conductor layer 3 may be constituted of one of various materials, which are capable of generating the electric charges when being exposed to the radiation. In this embodiment, the recording photo-conductor layer 3 is constituted of a material, which contains a-Se as the principal constituent. The material, which contains a-Se as the principal constituent, has the advantages in that a quantum efficiency is comparatively high with respect to the radiation and in that a dark resistance is high. The thickness of the material, which contains a-Se as the principal constituent and constitutes the recording photo-conductor layer 3, should preferably fall within the range of 100μm to 2,000μm. Particularly, in cases where the radiation image detector 10 is to be used for mammography, the thickness of the recording photo-conductor layer 3 should more preferably fall within the range of 150μm to 250μm. Also, in cases where the radiation image detector 10 is to be used for general image recording operations, the thickness of the recording photo-conductor layer 3 should more preferably fall within the range of 500μm to 1,200μm.

The charge transporting layer 4 may be constituted of one of various materials having the characteristics such that the difference between the mobility of the electric charges, which occur in the first electrode layer 1 at the time of the recording of the radiation image, and the mobility of the electric charges, which have the polarity opposite to the polarity of the electric charges occurring in the first electrode layer 1, is as large as possible (e.g., at least $10^2$, and preferably at least $10^3$). The charge transporting layer 4 should preferably be constituted of, for example, an organic compound, such as a poly-N-vinyl carbazole (PVK), N,N'-diphenyl-N,N'-bis(3-methylphenyl)-[1,1'-biphenyl]-4,4'-diamine (TPD), or a discotic liquid crystal; or a semiconductor substance, such as a polymer (polycarbonate, polystyrene, PVK) dispersion of TPD, a-Se having been doped with 10 ppm to 200ppm of Cl, or $As_2Se_3$. The thickness of the charge transporting layer 4 should preferably fall within the range of approximately 0.2μm to approximately 2μm.

The reading photo-conductor layer 5 may be constituted of one of various materials, which exhibit the electrical conductivity when being exposed to the reading light or erasing light. The reading photo-conductor layer 5 should preferably be constituted of, for example, a photo-conductive material containing, as a principal constituent, at least one substance selected from the group consisting of a-Se, Se—Te, Se—As—Te, metal-free phthalocyanine, metallo-phthalocyanine, magnesium phthalocyanine (MgPc), phase II of vanadyl phthalocyanine (VoPc), and copper phthalocyanine (CuPc). The thickness of the reading photo-conductor layer 5 should preferably fall within the range of approximately 5μm to approximately 20μm.

With the conventional radiation image detector employed for the optical read-out technique, in cases where the first electrode layer is grounded for the readout of the image signal after the radiation image has been recorded on the radiation image detector in the manner described above, positive holes are injected from the first electrode layer into the recording photo-conductor layer due to the effects of the electrons having been accumulated at the charge accumulating section. Due to the injection of the positive hole, noise is mixed in the image signal having been read out, and the image quality of the radiation image having been read out becomes bad.

Therefore, with this embodiment of the radiation image detector 10, such that the injection of the positive holes from the first electrode layer 1 may be prevented from occurring, the hole injection blocking layer 2 is located between the first electrode layer 1 and the recording photo-conductor layer 3.

Also, such that the hole injection blocking effects of the hole injection blocking layer 2 may be obtained sufficiently, the hole injection blocking layer 2 is formed so as to contain the alloy of $Sb_xS_{100-x}$, and the composition ratio is set such that x represents a number satisfying the condition of $41 \leq x \leq 60$.

Figure 3:
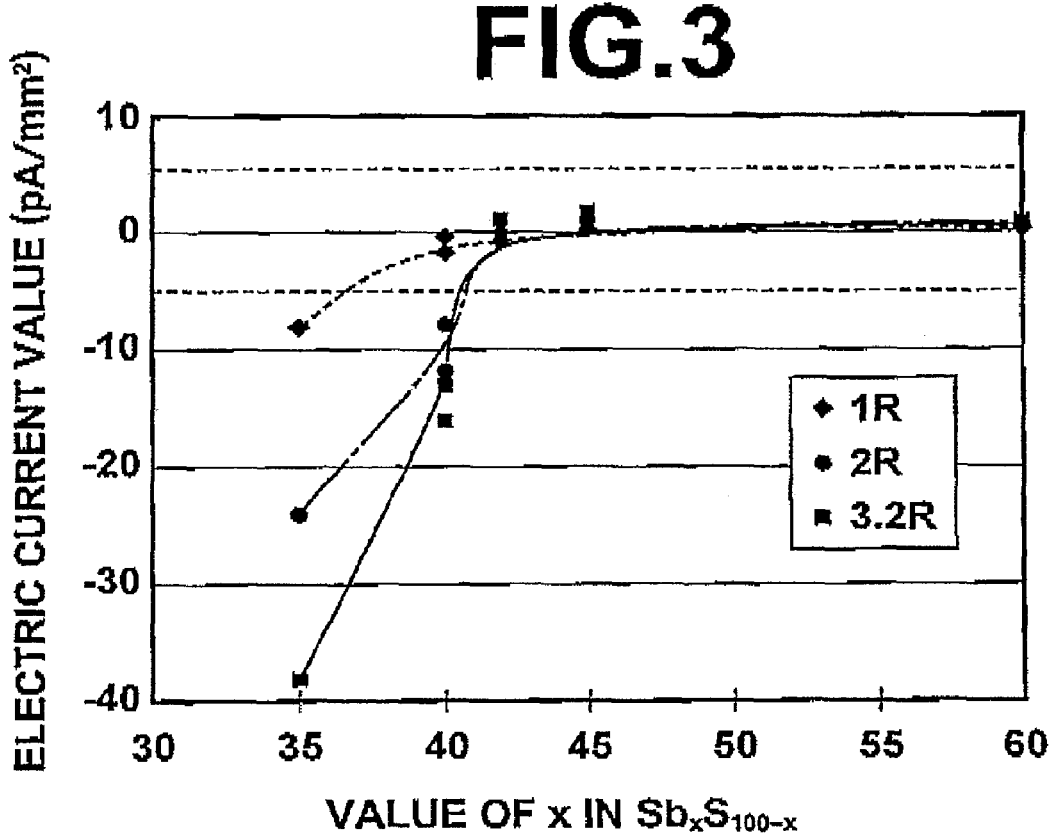
FIG. 3 is a graph showing an alteration of an electric current value with respect to an alteration of a composition ratio in $Sb_xS_{100-x}$.

FIG. 3 is a graph showing an alteration of an electric current value with respect to an alteration of a composition ratio in $Sb_xS_{100-x}$. Specifically, FIG. 3 shows the results of experiments, wherein the composition ratio in the alloy of $Sb_xS_{100-x}$ is set to be each of $Sb_{35}S_{65}$, $Sb_{40}S_{60}$, $Sb_{42}S_{58}$, $Sb_{45}S_{55}$, and $Sb_{60}S_{40}$, and wherein the value of the electric current occurring due to the positive hole injection from the first electrode layer 1 is measured. Also, 1R, 2R and 3.2R illustrated in FIG. 3 represent the radiation doses delivered to the radiation image detector 10. As illustrated in FIG. 3, it has been found that, in cases where x in the formula $Sb_xS_{100-x}$ represents a number satisfying the condition of $41 \leq x \leq 60$, the electric current value decreases markedly and falls within the range indicated by the broken lines (e.g., ±5 pA/mm$^2$) with respect to every value of the radiation dose. In this case, the thickness of the hole injection blocking layer 2 is set at 0.5 μm. The thickness of the hole injection blocking layer 2 is not limited to 0.5 μm as in this embodiment. In cases where the thickness of the hole injection blocking layer 2 is at least approximately 0.25 μm, a uniform film is capable of being obtained, and the hole injection blocking performance is capable of being enhanced. In cases where the thickness of the hole injection blocking layer 2 is set at a value larger than approximately 0.25μm, the hole injection blocking performance is capable of being enhanced even further. However, if the thickness of the hole injection blocking layer 2 is markedly large, an amorphous selenium film will not be capable of being obtained easily after the film formation, and local charge injection will arise from the crystallized region. Therefore, the thickness of the hole injection blocking layer 2 should preferably fall within the range of 0.25μm to 3μm.

The hole injection blocking layer containing the alloy of $Sb_xS_{100-x}$, wherein the composition ratio falls within the range of $41 \leq x \leq 60$, may be produced in the manner described below. Specifically, for example, a quantity of Sb and a quantity of S are weighed such that the atomic ratio may coincide with the composition ratio falling within the range described above. The weighed quantity of Sb and the weighed quantity of S are mixed together, and the resulting mixture is loaded into a tube of Pyrex glass (trade name). Also, the mixture having been loaded into the Pyrex glass tube is subjected to vacuum sealing and is allowed to undergo a reaction at a high temperature. The alloy of $Sb_xS_{100-x}$ is thus prepared. The alloy of $Sb_xS_{100-x}$ is then accommodated in a stainless steel crucible and subjected to film formation by vacuum evaporation processing with resistance heating.

How a radiation image is recorded on the aforesaid first embodiment of the radiation image detector 10 and is then read out from the radiation image detector 10 will be described hereinbelow.

Figure 4A:
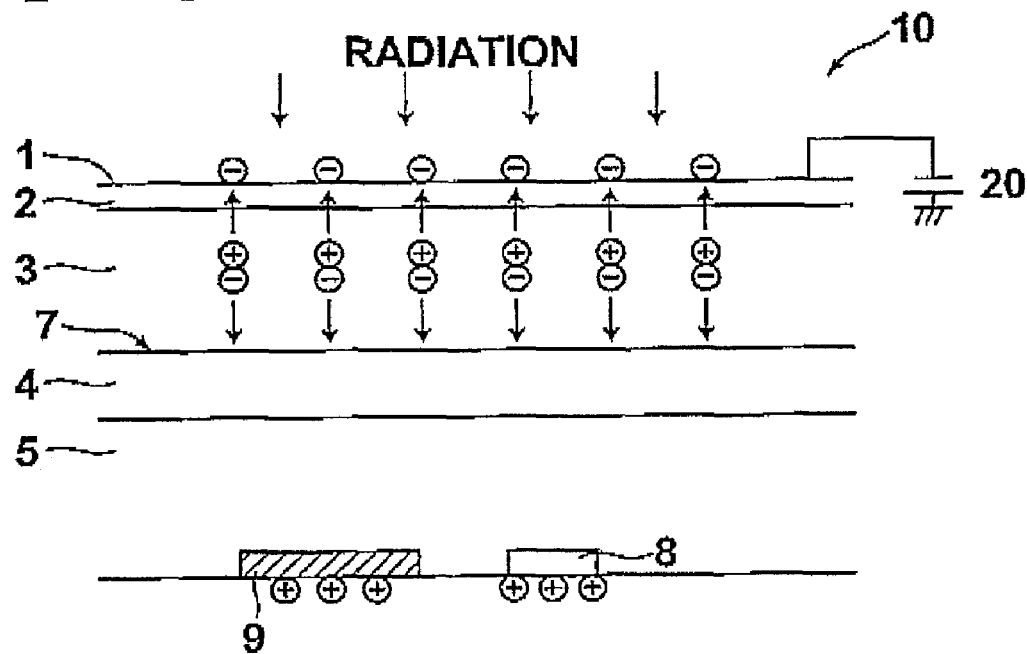
FIGS. 4A and 4B are explanatory views showing how a radiation image is recorded on the first embodiment of the radiation image detector in accordance with the present invention.

Firstly, as illustrated in FIG. 4A, a negative voltage is applied from a high voltage electric power source 20 to the first electrode layer 1 of the radiation image detector 10. In this state, the radiation carrying the radiation image information of an object is irradiated from the side of the first electrode layer 1 of the radiation image detector 10.

Figure 4B:
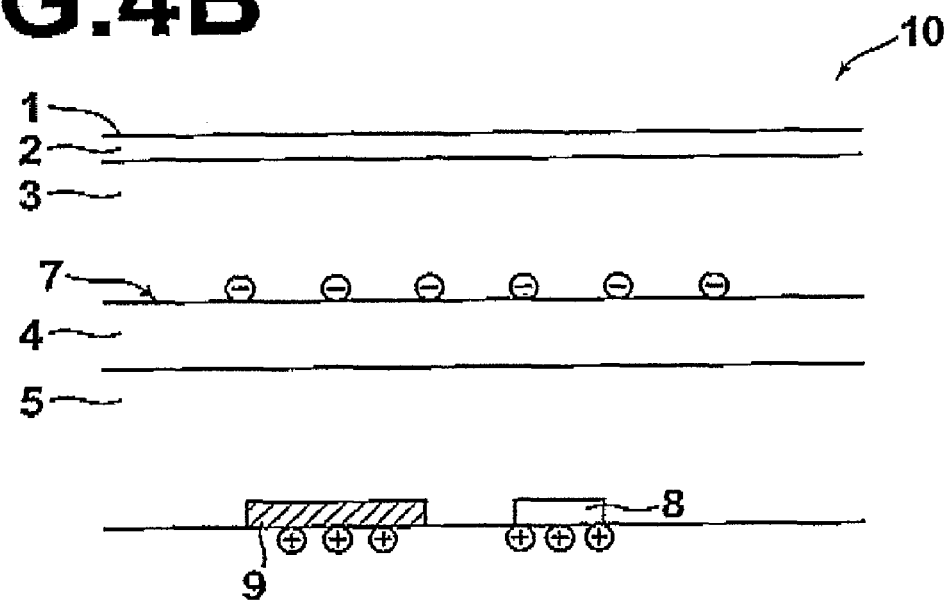

The radiation, which has thus been irradiated to the radiation image detector 10, passes through the first electrode layer 1 and impinges upon the recording photo-conductor layer 3. As a result, pairs of positive and negative charges are generated in the recording photo-conductor layer 3 by the irradiation of the radiation. Of the pairs of positive and negative charges having been generated in the recording photo-conductor layer 3, the positive charges combine with the negative charges occurring in the first electrode layer 1 and become extinct. Of the pairs of positive and negative charges having been generated in the recording photo-conductor layer 3, the negative charges are accumulated as latent image charges at a charge accumulating section 7, which is formed at the interface between the recording photo-conductor layer 3 and the charge transporting layer 4. The radiation image is thus recorded as illustrated in FIG. 4B.

Figure 5:
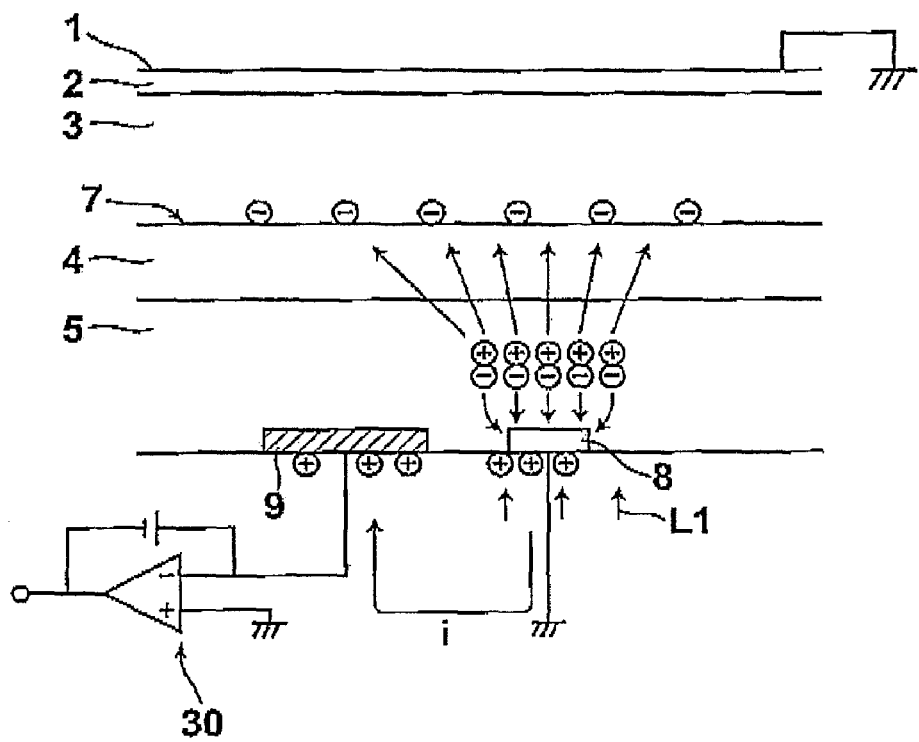
FIG. 5 is an explanatory views showing how the radiation image is read out from the first embodiment of the radiation image detector in accordance with the present invention.

In cases where the radiation image having thus been recorded is to be read out from the radiation image detector 10, as illustrated in FIG. 5, the first electrode layer 1 is grounded. In this state, reading light L1 is irradiated from the side of the second electrode layer 6 to the radiation image detector 10. The reading light L1, which has been irradiated from the side of the second electrode layer 6, passes through the transparent linear electrode 8 of the second electrode layer 6 and impinges upon the reading photo-conductor layer 5. As a result, pairs of positive and negative charges are generated in the reading photo-conductor layer 5 by the irradiation of the reading light L1. Of the pairs of positive and negative charges having been generated in the reading photo-conductor layer 5, the positive charges combine with the latent image charges having been accumulated at the charge accumulating section 7. Also, of the pairs of positive and negative charges having been generated in the reading photo-conductor layer 5, the negative charges combine with the positive charges occurring in the light blocking linear electrode 9 via a charge amplifier 30, which has been connected to the light blocking linear electrode 9.

An electric current flows through the charge amplifier 30 at the time, at which the negative charges occurring in the reading photo-conductor layer 5 and the positive charges occurring in the light blocking linear electrode 9 thus undergo the combination. The electric current thus flowing through the charge amplifier 30 is integrated and is detected as an image signal. In this manner, the image signal representing the radiation image having been recorded is read out from the radiation image detector 10.

With this embodiment of the radiation image detector 10 in accordance with the present invention, the aforesaid hole injection blocking layer 2 is located between the first electrode layer 1 and the recording photo-conductor layer 3. Therefore, as illustrated in FIG. 5, in cases where the first electrode layer 1 is grounded, the injection of the positive holes from the first electrode layer 1 into the recording photo-conductor layer 3 is capable of being blocked sufficiently. Accordingly, noise arising in the image signal due to the positive hole injection described above is capable of being suppressed, and the image quality of the radiation image having been read out from the radiation image detector 10 is capable of being enhanced. The reason for the hole injection blocking effects obtained as with this embodiment of the radiation image detector 10 has not yet been clarified sufficiently. However, it is considered that the quantity of S defects in the atom arrangement becomes large due to the concentration of Sb higher than in an ordinary stoichiometric ratio state, and that the large quantity of the S defects contributes to the blocking of the positive holes.

In the aforesaid first embodiment of the radiation image detector 10 in accordance with the present invention, the hole injection blocking layer 2 is formed directly on the recording photo-conductor layer 3. However, in cases where the hole injection blocking layer 2 is formed by the vacuum evaporation processing with resistance heating, the recording photo-conductor layer 3 having been already formed is exposed to radiant heat coming from the crucible having been heated to a temperature of approximately 555° C. In such cases, since a-Se undergoes the crystallization at a temperature of approximately 44° C., crystal nucleuses are formed in the recording photo-conductor layer 3. In cases where the radiation image detector is used repeatedly, the crystal nucleuses become large, and therefore defects occur in the radiation image having been read out from the radiation image detector.

Figure 6:
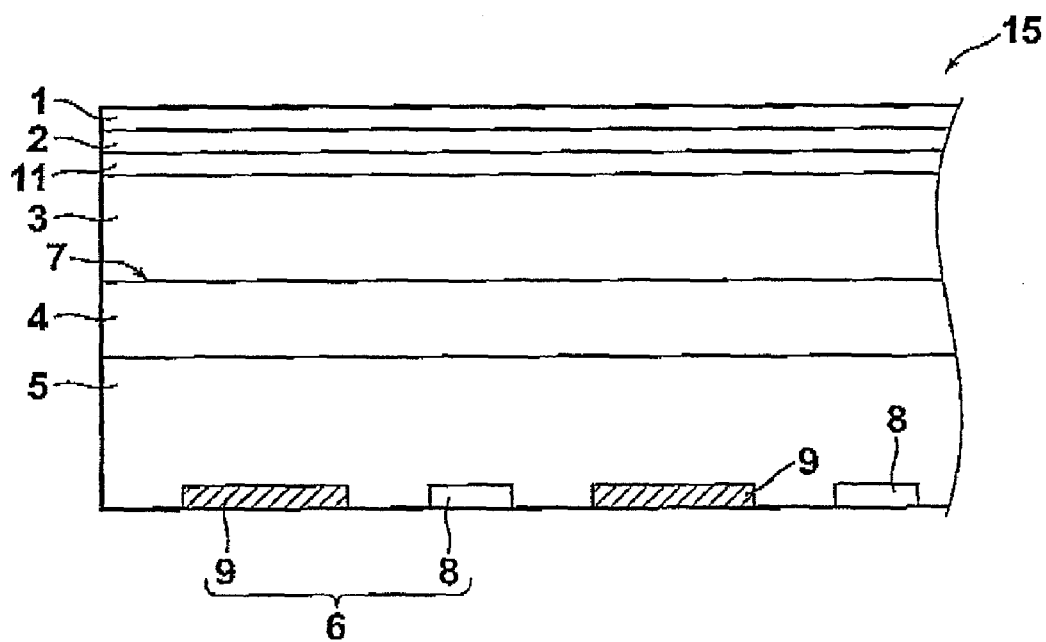
FIG. 6 is a sectional view showing a modification of the first embodiment of the radiation image detector in accordance with the present invention.

In order for the aforesaid problems to be eliminated, as in a radiation image detector 15 illustrated in FIG. 6, a crystallization preventing layer 11 containing Se and As as the principal constituents may be located between the hole injection blocking layer 2 and the recording photo-conductor layer 3. The crystallization preventing layer 11 containing Se and As as the principal constituents has a crystallization temperature higher than the crystallization temperature of the recording photo-conductor layer 2 containing a-Se as the principal constituent. Therefore, in cases where the crystallization preventing layer 11 containing Se and As as the principal constituents is located between the hole injection blocking layer 2 and the recording photo-conductor layer 3, the formation of the crystal nucleuses at the time of the formation of the hole injection blocking layer 2 is capable of being suppressed.

As described above, the crystallization preventing layer 11 is formed so as to have the composition containing Se and As as the principal constituents. However, it has been found that, if the concentration of the As constituent is markedly high, the crystallization preventing layer 11 will attract the positive holes, and the hole injection blocking effects of the hole injection blocking layer 2 will become low.

Therefore, experiments were conducted to find an As concentration, at which the hole injection blocking effects of the hole injection blocking layer 2 were capable of being kept, and at which the crystallization preventing effects were capable of being obtained. The results shown in Table 1 below were obtained. As described above, as for the hole injection blocking effects, an evaluation was made by the measurement of the electric current value occurring due to the positive hole injection from the first electrode layer 1. In cases where the measured electric current value fell outside the range of 5 pA/mm$^2$ (absolute value), the result was rated as being "o". In cases where the measured electric current value fell within the range of 5 pA/mm$^2$ (absolute value), the result was rated as being "x". As for the crystallization preventing effects, after the radiation image detector having been prepared had been stored at a temperature of 40° C. for two months in a thermostatic chamber, the radiation image recording and read-out operations were performed, and an evaluation was made in accordance with the extent of image defects in the radiation image having been read out. In cases where the crystallization occurred with the recording photo-conductor layer or the crystallization preventing layer, electric charges were injected from the crystallized regions, and black defects occurred in the image. In cases where at least 300 pieces of the black image defects due to the crystallization appeared over the entire area of the image, the result was rated as being "x". In cases where less than 300 pieces of the black image defects due to the crystallization appeared over the entire area of the image, the result was rated as being "o".

TABLE 1

| | Concentration of As (%) | | | | | | |
|---|---|---|---|---|---|---|---|
| | 0 | 2.5 | 5 | 8 | 12 | 14 | 16 |
| Hole injection blocking effects | ○ | ○ | ○ | ○ | ○ | ○ | x |
| Crystallization preventing effects | x | ○ | ○ | ○ | ○ | ○ | ○ |

As for the crystallization preventing layer 11, the evaluation was made with respect to each of layer samples, wherein the As concentration was set at various different values of 0%, 2.5%, 5%, 8%, 12%, 14%, and 16%, and wherein the thickness was set to fall within the range of 0.5±0.2μm.

Specifically, an Se raw material and an $As_2Se_3$ raw material were introduced into different pieces of crucibles. The two crucibles and a substrate, on which the layers ranging from the second electrode layer 6 to the recording photo-conductor layer 3 had been formed, were located in a vacuum evaporation apparatus, and the vacuum evaporation apparatus was evacuated.

Thereafter, the crucible containing the Se raw material and the crucible containing the $As_2Se_3$ raw material were heated simultaneously by resistance heaters. The co-vacuum evaporation processing was thus performed, and the crystallization preventing layer 11 was formed. The concentration of the As constituent was adjusted in the manner described below. Specifically, the crucible containing the Se raw material was heated to a temperature of 275° C., and the vacuum evaporation rate was set at a predetermined value. Also, at the same time, in order for the predetermined As concentration to be obtained, the crucible containing the $As_2Se_3$ raw material was heated to a predetermined temperature, and the vacuum evaporation rate was set at a predetermined value. In this state, the shutter on the side of the substrate was opened, and the vacuum evaporation processing was performed. In cases where a low As concentration was to be obtained, the crucible containing the $As_2Se_3$ raw material was heated to a low temperature. In cases where a high As concentration was to be obtained, the crucible containing the $As_2Se_3$ raw material was heated to a high temperature. For example, in cases where the crucible containing the $As_2Se_3$ raw material was heated to a temperature of 350° C., the As concentration was capable of being set at 2.5%. In cases where the crucible containing the $As_2Se_3$ raw material was heated to a temperature of 400° C., the As concentration was capable of being set at 12%. The temperature range for obtaining the As concentration range listed in Table 1 might be the range of 350° C. to 440° C. In each of the cases, the temperature was lower by at least 100° C. than the temperature of 555° C., which was set at the time of the vacuum evaporation processing for $Sb_xS_{100-x}$. Therefore, the radiant heat coming from the crucible was low, and the possibility of the crystal nucleuses being formed at the a-Se surface at the time of the vacuum evaporation processing for the crystallization preventing layer was low.

In different experiments, at the final stage of the a-Se vacuum evaporation processing for the recording photo-conductor layer 3, the crucible containing the $As_2Se_3$ raw material was heated, the shutter of the crucible containing the $As_2Se_3$ raw material was opened, the a-Se and $As_2Se_3$ co-vacuum evaporation processing was thus performed, and the crystallization preventing layer was formed. In such cases, the same effects were obtained.

As shown in Table 1, it has been found that, in cases where the concentration of the As constituent is at least 16%, the hole injection blocking effects become small. Also, it has been found that, in cases where the concentration of the As constituent is 2.5%, the crystallization preventing effects are capable of being obtained sufficiently. From the results of the evaluation shown in Table 1, the concentration of the As constituent in the crystallization preventing layer 11 should preferably fall within the range of 2% to 15%.

Figure 7:
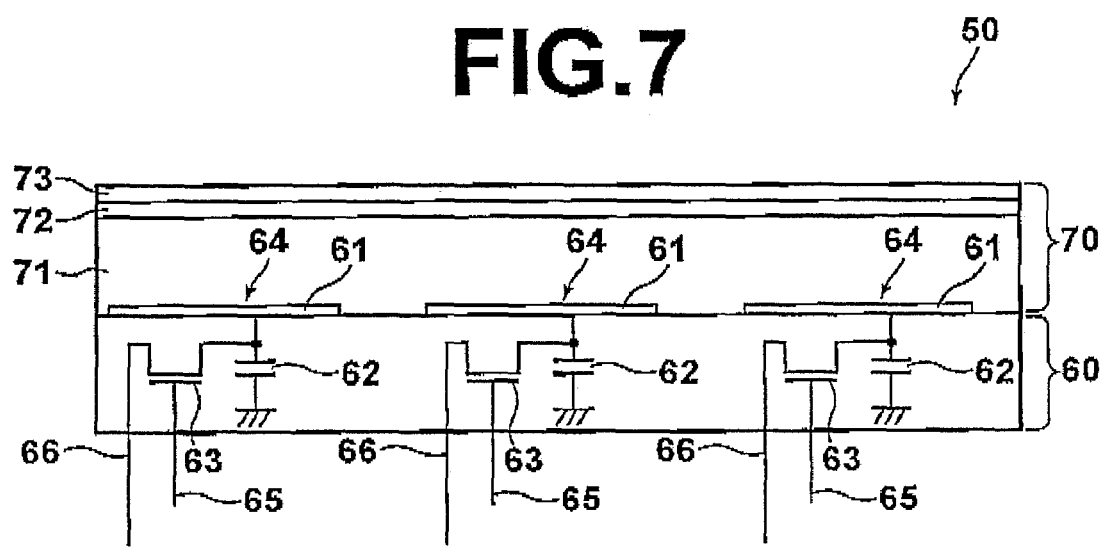
FIG. 7 is a partially sectional view showing a second embodiment of the radiation image detector in accordance with the present invention.

A second embodiment of the radiation image detector in accordance with the present invention will be described hereinbelow. The second embodiment of the radiation image detector in accordance with the present invention is the radiation image detector employed for the electrical read-out technique. FIG. 7 is a partially sectional view showing a second embodiment of the radiation image detector in accordance with the present invention.

As illustrated in FIG. 7, a radiation image detector 50, which is the second embodiment of the radiation image detector in accordance with the present invention, comprises an active matrix substrate 60. The radiation image detector 50 also comprises a radiation detecting section 70, which is overlaid on the active matrix substrate 60.

The radiation detecting section 70 is provided with a semiconductor layer 71, which has been formed over approximately the entire area of the top surface of the active matrix substrate 60. The radiation detecting section 70 is also provided with a hole injection blocking layer 72, which has been overlaid on the semiconductor layer 71. The radiation detecting section 70 is further provided with a top electrode 73, which has been overlaid on the hole injection blocking layer 72.

The semiconductor layer 71 has the electromagnetic wave conductivity and is capable of generating the electric charges within the film when being exposed to the X-rays. As the semiconductor layer 71, it is possible to employ, for example, an amorphous a-Se film containing selenium as the principal constituent and having a film thickness falling within the range of 100 μm to 1,000 μm. The semiconductor layer 71 is formed on the active matrix substrate 60 by the vacuum evaporation processing.

The top electrode 73 is formed from a low-resistance electrically conductive material, such as Au or Al.

The active matrix substrate 60 comprises a plurality of pixels 64, 64, . . . . Each of the pixels 64, 64, . . . is provided with a collecting electrode 61 for collecting the electric charges having been generated in the semiconductor layer 71. Each of the pixels 64, 64, . . . is also provided with an accumulating capacitor 62 for accumulating the electric charges having been collected by the collecting electrode 61. Each of the pixels 64, 64, . . . is further provided with a TFT switch 63 for reading out the electric charges having been accumulated by the accumulating capacitor 62. The active matrix substrate 60 also comprises a plurality of scanning wires 65, 65, . . . for turning on and off the corresponding TFT switches 63, 63, . . . . The active matrix substrate 60 further comprises a plurality of data wires 66, 66, . . . through which the electric charges having been accumulated by the corresponding accumulating capacitors 62, 62, . . . are to be read out.

As the TFT switch 63, ordinarily, an a-Si TFT, in which amorphous silicon is utilized as an active layer, is employed.

Figure 8:
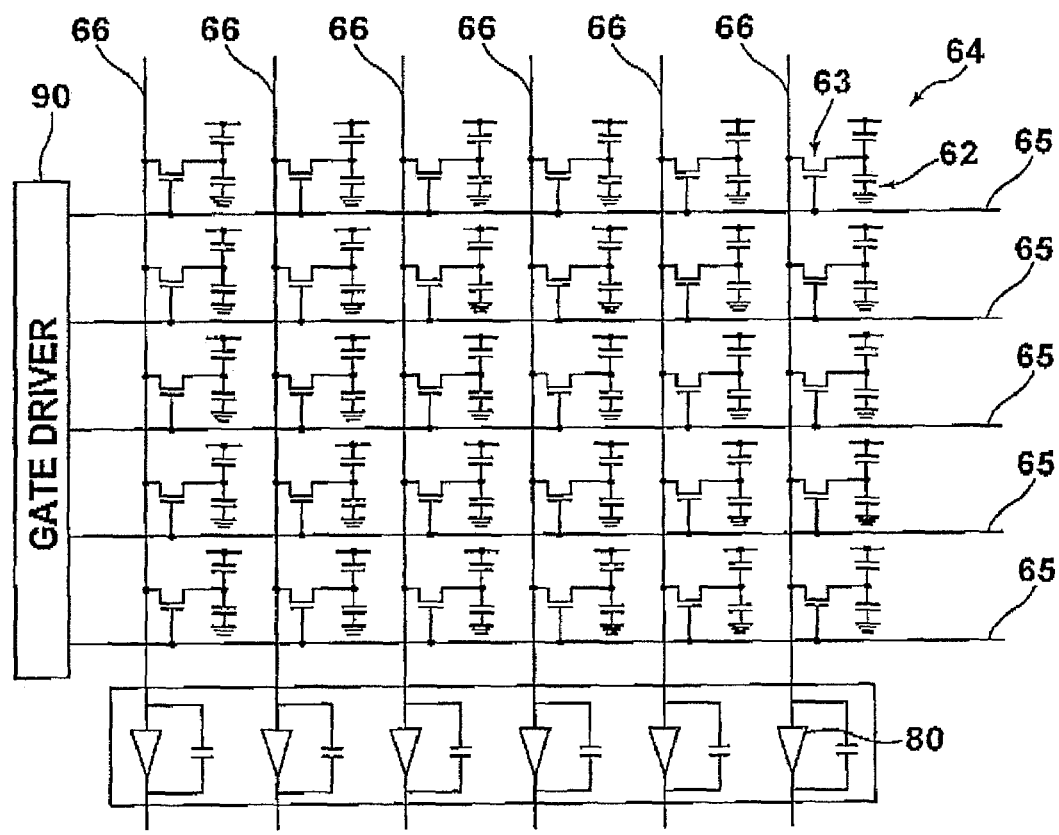
FIG. 8 is a plan view showing an active matrix substrate in the second embodiment of the radiation image detector in accordance with the present invention.

FIG. 8 is a plan view showing the active matrix substrate 60. As illustrated in FIG. 8, the active matrix substrate 60 is provided with the plurality of the pixels 64, 64, . . . arrayed in a two-dimensional pattern. Each of the pixels 64, 64, . . . is provided with the accumulating capacitor 62 and the TFT switch 63. Also, the active matrix substrate 60 is provided with the plurality of the scanning wires 65, 65, . . . and the plurality of the data wires 66, 66, . . . , which are located in a lattice-like pattern. Further, the terminal of each of the data wires 66, 66, . . . is connected to a read-out circuit 80, which is constituted of an amplifier for detecting the signal charges having flown out through the corresponding data wire 66. Each of the scanning wires 65, 65, . . . is connected to a gate driver 90 for outputting a control signal for turning on and off the corresponding TFT switches 63, 63, . . . .

Figure 9:
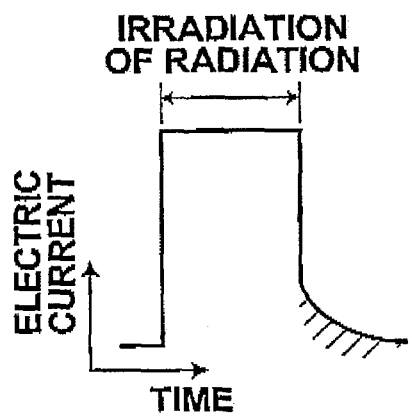
FIG. 9 is an explanatory view showing occurrence of a residual image electric current in a conventional radiation image detector.

In the cases of the conventional radiation image detector employed for the electrical read-out technique, at the time of the radiation image recording and readout, a positive voltage is applied to the top electrode. At the time at which the positive voltage is applied to the top electrode in the manner described above, the positive holes are injected from the top electrode into the semiconductor layer by the voltage application. As a result, as illustrated in FIG. 9, after the irradiation of the radiation has been ceased, the positive holes are injected from the top electrode. The thus injected positive holes are detected as a residual image current (as indicated by the hatching in FIG. 9). Therefore, noise is mixed in the image signal having been read out, and the image quality of the radiation image having been read out becomes bad.

Therefore, with this embodiment of the radiation image detector 50, in order for the injection of the positive holes from the top electrode 73 to be blocked, the hole injection blocking layer 72 is located between the top electrode 73 and the semiconductor layer 71.

As in the aforesaid first embodiment of the radiation image detector in accordance with the present invention, such that the hole injection blocking effects of the hole injection blocking layer 72 may be obtained sufficiently, the hole injection blocking layer 72 is formed so as to contain the alloy of $Sb_xS_{100-x}$, and the composition ratio is set such that x represents a number satisfying the condition of $41 \leq x \leq 60$. The hole injection blocking layer 72 may be produced by the same process as that for the hole injection blocking layer 2 in the aforesaid first embodiment of the radiation image detector in accordance with the present invention.

Figure 10:
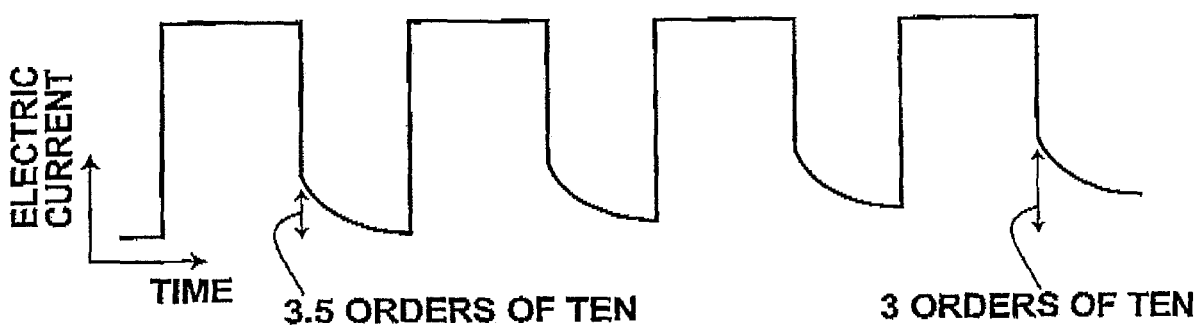
FIG. 10 is an explanatory view showing occurrence of a residual image electric current in a conventional radiation image detector.

FIG. 10 shows the effects of the positive hole injection occurring in cases where the composition ratio in $Sb_xS_{100-x}$ of the hole injection blocking layer 72 was set as being $Sb_{40}S_{60}$. As illustrated in FIG. 10, at the time of the first irradiation of the radiation, the ratio of the residual image electric current with respect to the signal current at the time of the irradiation of the radiation was 3.5 orders of ten. However, in cases where the irradiation of the radiation was iterated, the ratio of the residual image electric current with respect to the signal current at the time of the irradiation of the radiation increased to 3 orders of ten, and the quantity of the residual image electric current became larger than the quantity negligible as noise.

In cases where the composition ratio in $Sb_xS_{100-x}$ of the hole injection blocking layer 72 was set as being $Sb_{42}S_{58}$, at the time of the first irradiation of the radiation, the ratio of the residual image electric current with respect to the signal current at the time of the irradiation of the radiation was 4.5 orders of ten. In cases where the irradiation of the radiation was thereafter iterated, the residual image electric current due to the injection of the positive holes did not increase. Also, in cases where the composition ratio in $Sb_xS_{100-x}$ of the hole injection blocking layer 72 was set as being $Sb_{45}S_{55}$, at the time of the first irradiation of the radiation, the ratio of the residual image electric current with respect to the signal current at the time of the irradiation of the radiation was 4 orders of ten. In cases where the irradiation of the radiation was thereafter iterated, the residual image electric current due to the injection of the positive holes did not increase.

Specifically, in cases where the composition ratio in $Sb_xS_{100-x}$ of the hole injection blocking layer 72 is set so as to satisfy the condition of $41 \leq x \leq 60$, the residual image electric current due to the injection of the positive holes is capable of being suppressed. Also, in cases where the irradiation of the radiation is iterated, the residual image electric current due to the injection of the positive holes is capable of being prevented from becoming large.

The thickness of the hole injection blocking layer 72 is set at 0.5μm. However, the thickness of the hole injection blocking layer 72 is not limited to 0.5μm as in this embodiment. In cases where the thickness of the hole injection blocking layer 72 is at least approximately 0.25μm, a uniform film is capable of being obtained, and the hole injection blocking performance is capable of being enhanced. In cases where the thickness of the hole injection blocking layer 72 is set at a value larger than approximately 0.25μm, the hole injection blocking performance is capable of being enhanced even further. However, if the thickness of the hole injection blocking layer 72 is markedly large, an amorphous selenium film will not be capable of being obtained easily after the film formation, and local charge injection will arise from the crystallized region. Therefore, the thickness of the hole injection blocking layer 72 should preferably fall within the range of 0.25μm to 3μm.

How a radiation image is recorded on the aforesaid second embodiment of the radiation image detector 50 and is then read out from the radiation image detector 50 will be described hereinbelow.

Figure 11:
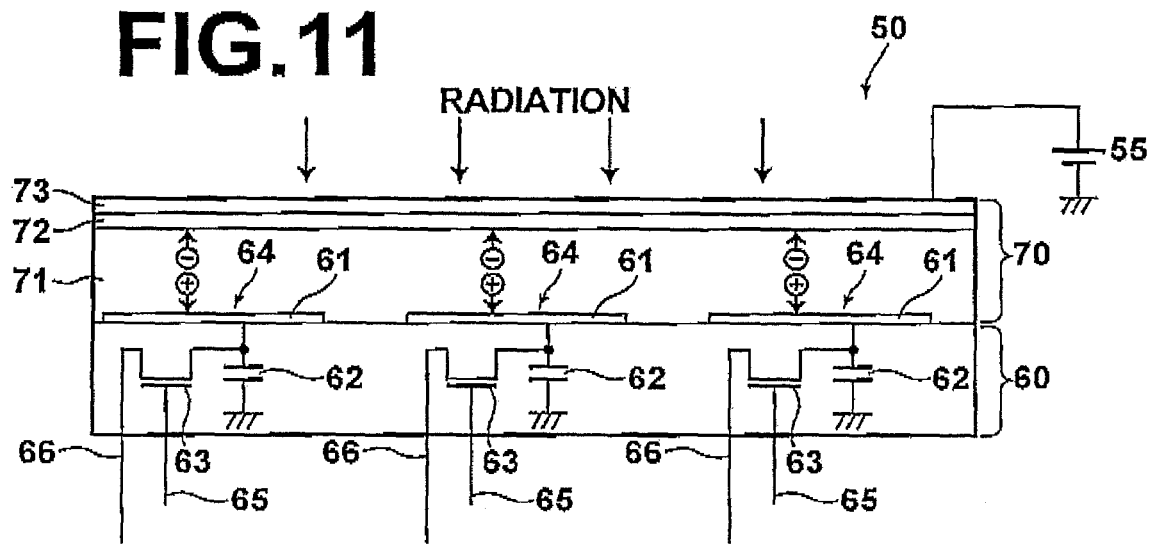
FIG. 11 is an explanatory view showing how a radiation image is recorded on the second embodiment of the radiation image detector in accordance with the present invention and is read out from the second embodiment of the radiation image detector in accordance with the present invention.

Firstly, as illustrated in FIG. 11, a positive voltage is applied from a voltage source 55 to the top electrode 73 of the radiation image detector 50. In this state, the radiation carrying the radiation image information of an object is irradiated from the side of the top electrode 73 of the radiation image detector 50.

The radiation, which has thus been irradiated to the radiation image detector 50, passes through the top electrode 73 and impinges upon the semiconductor layer 71. As a result, pairs of positive and negative charges are generated in the semiconductor layer 71 by the irradiation of the radiation. Of the pairs of positive and negative charges having been generated in the semiconductor layer 71, the negative charges combine with the positive charges occurring in the top electrode 73 and become extinct. Of the pairs of positive and negative charges having been generated in the semiconductor layer 71, the positive charges are collected as latent image charges by the collecting electrode 61 of each pixel 64 and accumulated by the corresponding accumulating capacitor 62. The radiation image is recorded in this manner.

In cases where the radiation image having thus been recorded is to be read out from the radiation image detector 50, control signals for turning on the TFT switches 63, 63, . . . are outputted successively from the gate driver 90 illustrated in FIG. 8 to the scanning wires 65, 65, . . . . The TFT switches 63, 63, . . . having been connected to each scanning wire 65 are turned on in accordance with the control signal having been outputted from the gate driver 90, and the accumulated electric charges are read out from the accumulating capacitor 62 of each pixel 64 to the data wire 66. The charge signal having flown to the data wire 66 is detected as an image signal by the charge amplifier of the read-out circuit 80. In this manner, the image signal representing the radiation image having been recorded is read out from the radiation image detector 50.

With this embodiment of the radiation image detector 50 in accordance with the present invention, the aforesaid hole injection blocking layer 72 is located between the top electrode 73 and the semiconductor layer 71. Therefore, the injection of the positive holes from the top electrode 73 into the semiconductor layer 72 is capable of being blocked sufficiently. Accordingly, noise arising in the image signal due to the positive hole injection described above is capable of being suppressed, and the image quality of the radiation image having been read out from the radiation image detector 50 is capable of being enhanced.

In the aforesaid second embodiment of the radiation image detector 50 in accordance with the present invention, the hole injection blocking layer 72 is formed directly on the semiconductor layer 71. However, in cases where the hole injection blocking layer 72 is formed by the vacuum evaporation processing with resistance heating, as in the cases of the aforesaid first embodiment of the radiation image detector 10 in accordance with the present invention, crystal nucleuses are formed in the semiconductor layer 71, and defects occur in the radiation image having been read out from the radiation image detector.

Figure 12:
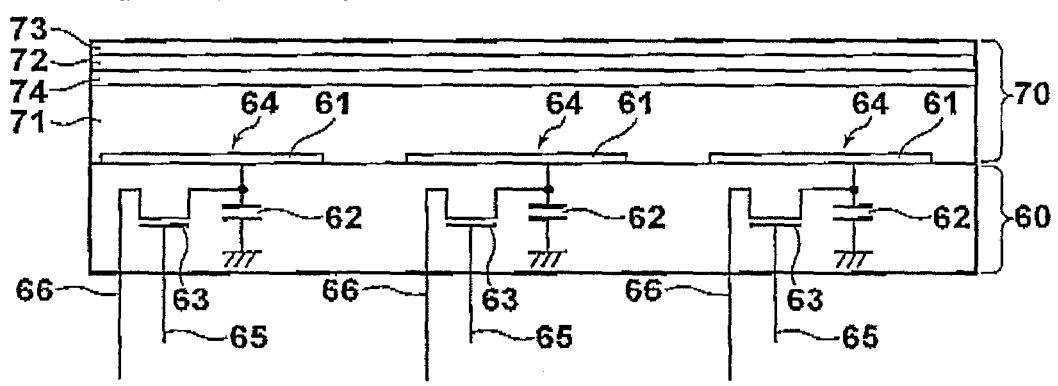
FIG. 12 is a sectional view showing a modification of the second embodiment of the radiation image detector in accordance with the present invention.
Figure 13:
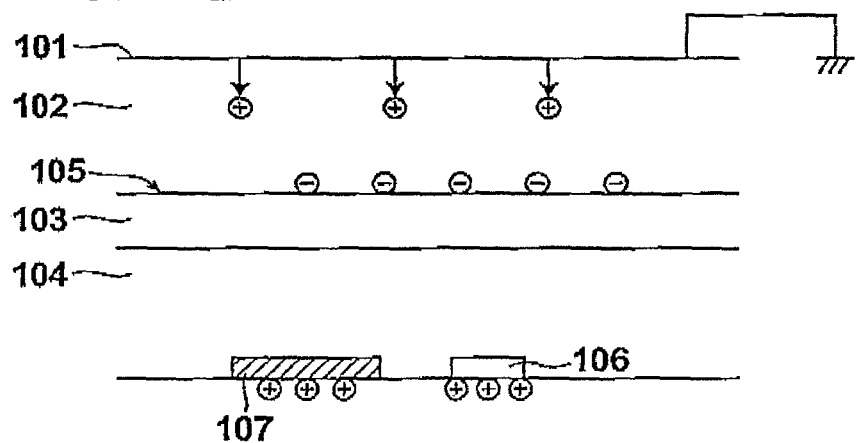
FIG. 13 is an explanatory view showing positive hole injection occurring in a conventional radiation image detector.

In order for the aforesaid problems to be eliminated, as in a radiation image detector 150 illustrated in FIG. 12, a crystallization preventing layer 74 containing Se and As as the principal constituents may be located between the hole injection blocking layer 72 and the semiconductor layer 71. As in the cases of the aforesaid first embodiment of the radiation image detector in accordance with the present invention, the concentration of the As constituent in the crystallization preventing layer 74 should preferably fall within the range of 2% to 15%.

In the embodiments described above, the radiation image detector in accordance with the present invention is constituted as a direct conversion type of a radiation image detector, in which the radiation is converted directly into the electric charges. However, the radiation image detector in accordance with the present invention is not limited to the direct conversion type of the radiation image detector. For example, the radiation image detector in accordance with the present invention may be constituted as a radiation image detector having a constitution similar to an indirect conversion type of a radiation image detector, in which the radiation is converted into light by a fluorescent substance, and the light is then converted into the electric charges. In the cases of the radiation image detector having the constitution similar to the indirect conversion type of the radiation image detector, the thickness of the a-Se layer is set to be thinner than in the cases of the direct conversion type of the radiation image detector, a first electrode layer having the light transmissivity is located, the fluorescent substance is located above the first electrode layer, and the light produced by the fluorescent substance is converted into the electric current. In the cases of the radiation image detector constituted in the manner described above, the thickness of each of the recording photoconductor layer and the semiconductor layer may fall within the range of approximately 1μm to approximately 30μm. Also, in the cases of the radiation image detector employed for the TFT red-out technique, the accumulating capacitor need not necessarily be provided.

What is claimed is:

1. A radiation image detector, comprising:
   i) a voltage applying electrode, to which a voltage is to be applied,
   ii) a semiconductor layer, which is capable of generating electric charges when radiation is irradiated to the semiconductor layer, and
   iii) an electrode for detecting an electric signal in accordance with a radiation dose,
   the voltage applying electrode, the semiconductor layer, and the electrode for detecting the electric signal being overlaid one upon another,
   an image signal in accordance with the electric charges, which have been generated in the semiconductor layer, being read out from the radiation image detector,
   wherein a hole injection blocking layer is located between the voltage applying electrode and the semiconductor layer, and
   the hole injection blocking layer contains an alloy of $Sb_xS_{100-x}$, where x represents a number satisfying the condition of $41 \leq x \leq 60$.

2. A radiation image detector as defined in claim 1 wherein a thickness of the hole injection blocking layer falls within the range of 0.25 μm to 3 μm.

3. A radiation image detector as defined in claim 1 wherein a crystallization preventing layer that contains Se and As as principal constituents is located between the hole injection blocking layer and the semiconductor layer.

4. A radiation image detector as defined in claim 1 wherein a concentration of the As constituent in the crystallization preventing layer falls within the range of 2% to 15%.

5. A radiation image detector as defined in claim 1 wherein a negative voltage is applied to the voltage applying electrode at the time of the irradiation of the radiation, and
   the voltage applying electrode is grounded at the time of the readout of the image signal from the radiation image detector.

6. A radiation image detector as defined in claim 1 wherein a positive voltage is applied to the voltage applying electrode at the time of the irradiation of the radiation.

* * * * *